United States Patent
Bauer

[15] 3,696,836
[45] Oct. 10, 1972

[54] POWER TRANSMISSION

[72] Inventor: Leo Bauer, Troy, Mich.

[73] Assignee: Sperry Rand Corporation, Troy, Mich.

[22] Filed: Jan. 6, 1971

[21] Appl. No.: 104,377

[52] U.S. Cl. ............................ 137/625.25, 91/388
[51] Int. Cl. .................................................. F16k 31/48
[58] Field of Search......... 137/625.25, 625.69, 637.2, 137/625.64, 625.66; 60/52 VS; 91/388

[56] References Cited

UNITED STATES PATENTS

| | | |
|---|---|---|
| 3,040,768 | 6/1962 | Pippenger..........137/625.64 X |
| 2,283,397 | 5/1942 | Tucker..............137/625.64 X |
| 2,880,755 | 4/1959 | Brown.............137/625.69 UX |
| 3,221,770 | 12/1965 | Faisandier............137/596.13 |

Primary Examiner—M. Cary Nelson
Assistant Examiner—Robert J. Miller
Attorney—Van Meter and George

[57] ABSTRACT

A variable speed reversible hydraulic transmission has a control valve which permits any desired value of pressure to be applied to the hydraulic motor in either direction at will. The valve controls a servomotor in the transmission and has two concentric spools slidable in the body and in each other. One spool is pressure responsive in either direction from a central position determined by opposed springs. The other spool is selectively shiftable to move the neutral position of the valve any desired distance to either side of the central position. The device is suitable for controlling the horizontal swing drive of a power shovel or crane to apply any desired accelerating or decelerating torques.

5 Claims, 6 Drawing Figures

INVENTOR.
Leo Bauer

INVENTOR.
Leo Bauer
BY
ATTORNEY

POWER TRANSMISSION

Many devices driven by variable speed reversible hydraulic transmissions are most advantageously controlled by selecting the value of torque which is applied to the load rather than by selecting the value of speed. Typical of such devices is a power shovel or crane having a swing drive for turning the device as a whole about a vertical axis. Such a device requires that the operator may be able to apply either accelerating or decelerating torques in either direction at any desired value, including zero value at which the unit is free to either coast or remain stationary. Ideally, such control must be effective regardless of whether the load requires input power to drive it or, through inertial or gravity forces, supplies energy to be absorbed by the drive.

It is an object of the present invention to provide an improved control valve for a variable speed reversible hydraulic transmission which enables the value of torque applied by the transmission to the load to be selected at any value and in either direction.

A further object is to provide a valve of this character of simple and reliable construction which may be produced at low cost and will perform with high efficiency.

These objects are achieved by the provision of a selectively operable pressure control valve for a variable speed reversible hydraulic transmission of the type controllable from full forward to full reverse by a hydraulic servomotor, the valve comprising a body having inlet, exhaust and motor ports, communicating with a valve bore, spring chambers at opposite ends of the valve bore, a pair of concentrically nested valve spools slidable in the bore and relative to each other for controlling flow between the body ports, oppositely acting spring means opposing the displacement of one spool in either direction from a central position, pressure responsive means for displacing the one spool in opposition to either of the spring means, and selectively operable means for displacing the other spool to establish any desired neutral position on either side of the central position established by the springs alone.

IN THE DRAWINGS

Figure 5:
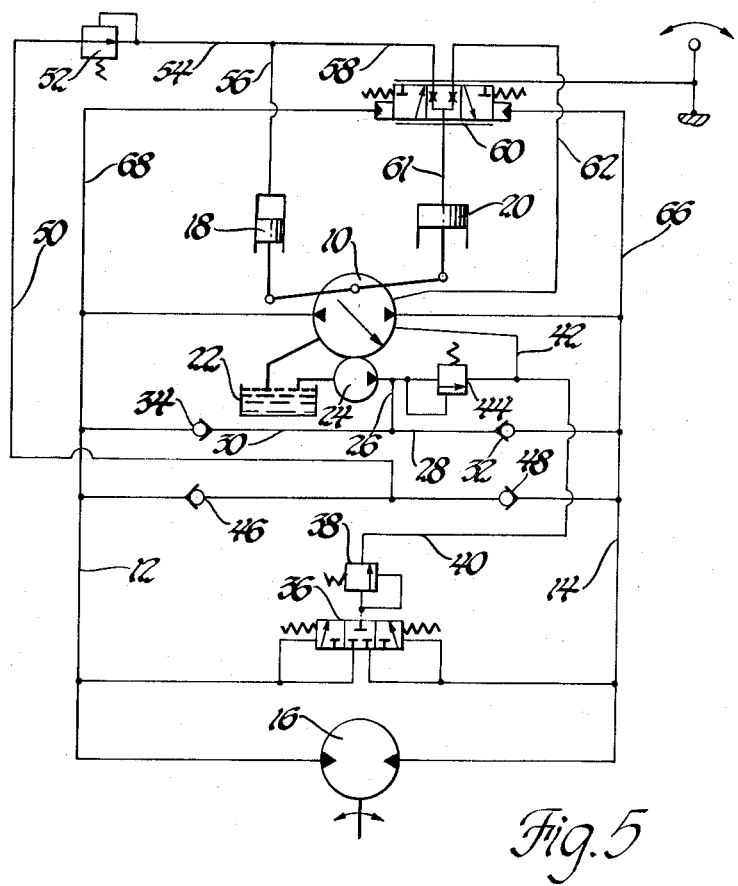
FIG. 5 is a hydraulic circuit diagram illustrating a transmission system incorporating the present invention.

Referring first to FIG. 5 where the schematic circuit of a typical hydraulic transmission, using the present invention, is shown, a reversible variable displacement pump 10 is connected by main conduits 12 and 14 to a fixed displacement fluid motor 16. The displacement of the pump 10 may be varied by means of a servomotor system of the differential area type comprising a small area piston and cylinder 18 and a large area piston and cylinder 20, the two areas differing by a ratio of 2:1. The system preferably also includes the customary auxiliaries such as a reservoir 22 to which the housing of the pump 10 may be connected and from which a charging and control pressure pump 24 withdraws fluid for delivery through lines 26, 28 and 30 to the replenishing check valves 32 and 34 respectively which feed into the lines 14 and 12. Overload relief may be provided by the usual shuttle valve 36 connected to a maximum pressure relief valve 38 which relieves through lines 40 and 42 to the casing of pump 10 and sump 22. A low pressure relief valve 44 limits the maximum charging and control pressure. Check valves 46 and 48 supply fluid from either of the main lines 12 or 14 to a control fluid supply line 50 which contains a pressure reducing valve 52 and feeds through lines 54 and 56 to the small area piston 18 and through the line 58 to a servocontrol valve 60 which controls the supply or exhaust of fluid to or from the large piston 20 via a line 61. An exhaust line 62 leads from the valve 60 to the casing of pump 10 and the reservoir 22. Except for the novel construction of the valve 60, the foregoing description is that of a typical hydraulic power transmission, and the present invention is applicable to many other varieties of the same.

Figures 1, 2:
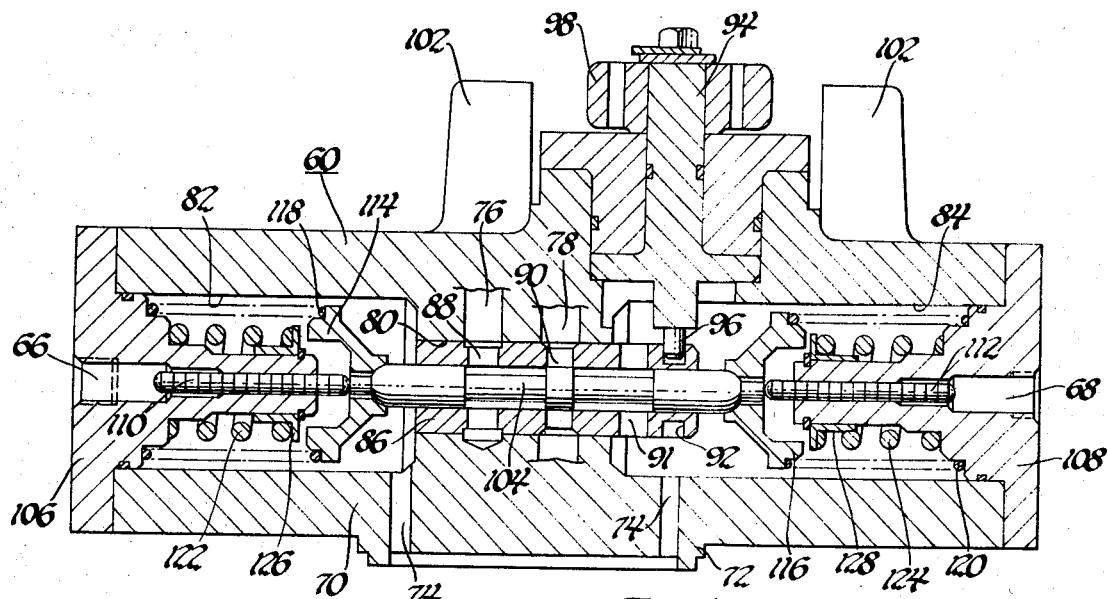
FIG. 1 is a longitudinal cross section of a valve incorporating a preferred form of the present invention.
FIG. 2 is a top view of a reversible variable displacement pump incorporating the valve of FIG. 1.
Figure 3:
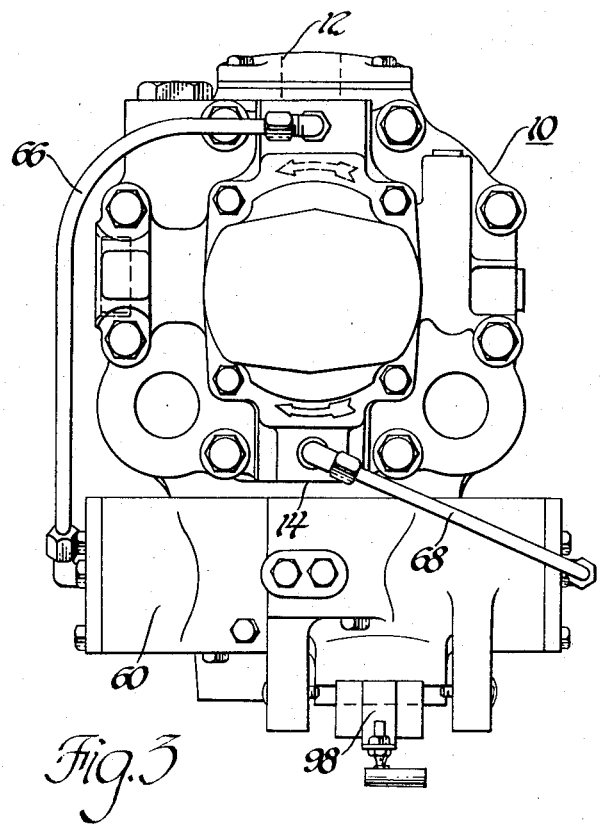
FIG. 3 is an end view of the pump of FIG. 2.
Figure 4:
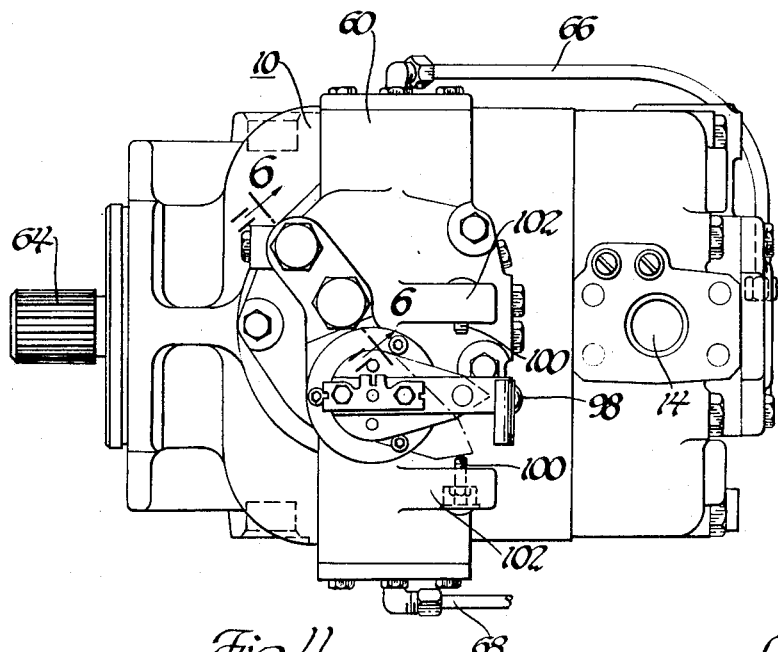
FIG. 4 is a side view of the pump of FIG. 2.

Referring now to FIGS. 2, 3 and 4, a typical reversible variable displacement pump 10 is there illustrated and may be of any suitable type having a hydraulic servomotor for controlling the direction and amount of its displacement. The splined drive shaft is illustrated at 64. The novel control valve of the present invention is preferably mounted as a unit on the side of the casing of the pump 10 as illustrated at 60. The main transmission conduits connect with the pump as indicated at 12 and 14, and from these lines, branch conduits 66 and 68 lead to opposite ends of the valve assembly 60.

Referring now to FIG. 1, the internal construction of the valve 60 is illustrated and comprises a main body 70 which is attachable to the pump 10 at a stepped cylindrical boss 72 by which the internals of the valve 60 may communicate with the inside of the casing of the pump 10 through passages 74. It will be understood, of course, that the valve 60 could also be mounted independently and connected with the pump and the remainder of the hydraulic system by suitable external conduits. The passages 74 serve as exhaust ports for the body 70, which also has an inlet port at 76 and a motor port at 78. These ports communicate with the conduits 58 and 61 respectively of FIG. 5 through drillings, not illustrated, in the boss 72 and the casing of the pump 10.

The body 70 contains a longitudinal valve bore 80, at each end of which is an enlarged spring chamber 82 and 84. Slidable in the bore 80 is a hollow valve spool 86 which has radial ports 88 and 90 communicating in all positions of the spool 86 with the inlet port 76 and the motor port 78 respectively. Radial ports 91 serve as exhaust ports. The spool 86 has a groove 92 at its right-hand end and the body 60 supports an oscillatable shaft 94 having an eccentric pin 96 engageable in the groove 92. Mounted on the outer end of the shaft 94 is an actuating arm 98 which is oscillatable between adjustable stops 100 (FIG. 4) contained in projecting bosses 102. Thus, by connecting an actuating link to the arm 98, the shaft 94 and eccentric pin 96 may be oscillated to shift the spool 86 to any desired position away from its central position which is illustrated in FIG. 1.

Slidable within the interior bore of the spool 86 is a second spool 104 having suitable lands and grooves for selectively connecting the motor port 90 with either the pressure port 88 or the exhaust port 91 in the spool 86. The spool 104 is arranged to respond to pressure changes in the main conduits of the transmission. For this purpose, the body is provided with end caps 106 and 108 which receive the control conduits 66 and 68 and contain small pistons 110 and 112 which abut the ends of the spool 104. Also abutting the ends of the spool 104 are a pair of spring retainers 114 and 116 against which springs 118 and 120 abut. These springs are relatively light and are the sole means which opposes fluid pressure on the pistons during the first increment of travel away from center position. Thus, the rate of pressure build-up with respect to initial displacement of the spool 104 is a low rate determined by the area of pistons 110, 112, and the spring rate of springs 118 and 120. A second pair of springs 122 and 124, which have a much higher rate, are also mounted within the spring chambers but do not contact the spring retainers 114 and 116 during initial travel of the spool 104 away from center. Suitable retainers 126 and 128 hold the heavy springs in position and may, if desired, exert a small pre-load upon them.

Figure 6:
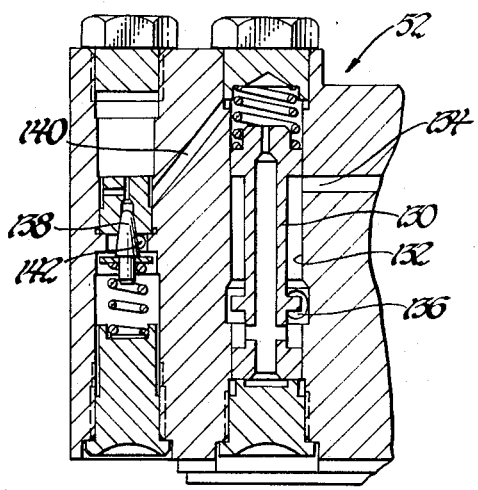
FIG. 6 is a fragmentary sectional view on line 6—6 of FIG. 4.

As illustrated in FIG. 6, the pressure reducing valve 52 may comprise a pilot operated spool 130 slidable in a bore 132 and arranged to control flow between an inlet port 134 communicating with line 50 of FIG. 5, and an outlet port 136 communicating with line 54. A spring loaded pilot valve 138 is responsive to the outlet pressure at 136 through the restricted internal bore in spool 130 and a passage 140. When the outlet pressure rises beyond a predetermined value, pilot valve 138 opens exhausting the chamber at the top of bore 132 to the exhaust port 142, allowing the spool 130 to rise.

In operation with the control arm 98 centered and with no load on the motor 16, the charging pump 24 supplies fluid through line 26 and any two of the check valves 32, 34, 46 and 48 into the line 50 and the reducing valve 52. The excess volume from the charging pump 24 passes over the relief valve 44 and line 42 to the reservoir 22. This pressure acts through lines 54 and 56 on the small area piston 18 of the servomotor system of the pump 10 and is delivered through line 58 to be available at the inlet port 76 of the valve 60. This valve, before reaching neutral, will have supplied pressure through line 61 to the large area piston 20 at a value one half that exerted on small area piston 18 and thus the servomotor of pump 10 will be stationary. This may occur at any displacement position, either forwardly or reversely and the motor 16 will continue to rotate with the load without either driving it or braking it. Alternatively, if the valve 60 arrived at neutral position with the servomotor of pump 10 also in neutral, the motor 16 will, of course, remain stopped.

When it is desired to apply a torque to the load, say for example in a clockwise direction, control arm 98 can be shifted which, acting through pin 96, will shift the outer spool 86, say to the left in FIG. 1. This will open port 90 to port 88, thus admitting pressure fluid to conduit 61 and large area piston 20. Acting from the position illustrated in FIG. 5, this will reduce the displacement of pump 10, exerting a braking force on the motor 16 and the load, causing pressure to rise in the main conduit 12 and the control branch 68. This is reflected on piston 112 which shifts the spool 104 against the force of spring 118 and eventually against the force of spring 122 also. This movement terminates when the spool 104 achieves a neutral position relative to the new position of the outer spool 86. Variations in the load reaction exerted on motor 16 will cause variations in pressure in the line 12 and these will act through branch 68 to shift spool 104 to the right or left as required and thus shift the displacement regulating servomotor of pump 10 to whatever new position is required in order to maintain the same pressure level in the main conduit 12. This may mean either speed-up or slow-down or even reversal.

For the application of torque upon the load in the opposite direction, the spool 86 will be shifted to the right of center position and in like manner, pressure will be caused to build up in the main conduit 14 and maintained at the value determined by the amount of displacement of spool 86 away from its center position. Since the spool 86 is small and light and mechanically independent of the pressure sensing mechanisms, only a light force is required to shift the spool, and it thus may be operated alternatively by a very light manual force or even by electrical or other low powered transducers.

I claim:

1. A selectively operable pressure controlled valve for a variable speed reversible hydraulic transmission of the type controllable from full forward to full reverse by a hydraulic servomotor, the valve comprising a body having inlet, exhaust and motor ports, communicating with a valve bore, spring chambers at opposite ends of the valve bore, a pair of concentrically nested valve spools slidable in the valve bore and relative to each other for controlling flow between the body ports, oppositely acting spring means opposing the displacement of one spool in either direction from a central position, pressure responsive means for displacing the one spool in opposition to either of the spring means, and selectively operable means for displacing the other spool to establish any desired neutral position on either side of the central position established by the springs alone.

2. A valve as defined in claim 1 wherein the outer one of the two spools has a circumferential groove at one end and the body carries a member oscillatable about an axis perpendicular to the spool and having an eccentric pin engageable with the groove in the spool to shift the latter.

3. A valve as defined in claim 2 wherein the selectively operable means includes the oscillatable member.

4. A valve as defined in claim 1 wherein the spring means includes a first light spring means engaging the one spool at its central position and a second heavy spring means of shorter length than the full travel of the one spool whereby the rate of pressure build up is low during the first travel away from center and increases to a higher rate when the heavy spring means engages the spool.

5. A valve as defined in claim 4 having stop means for confining the heavy spring means to a predetermined limit of expansion.

* * * * *